US009652428B2

(12) United States Patent
Albert et al.

(10) Patent No.: US 9,652,428 B2
(45) Date of Patent: May 16, 2017

(54) COUPLING DEVICE AND METHOD FOR DYNAMICALLY ALLOCATING USB ENDPOINTS OF A USB INTERFACE, AND EXCHANGE TRADING SYSTEM TERMINAL WITH COUPLING DEVICE

(75) Inventors: Elmar Albert, Rosenheim (DE); Andras Selmeczi, Leanyfalu (HU)

(73) Assignee: Unify GmbH & Co. KG, Munich (DE)

(*) Notice: Subject to any disclaimer, the term of this patent is extended or adjusted under 35 U.S.C. 154(b) by 326 days.

(21) Appl. No.: 14/382,222

(22) PCT Filed: Apr. 2, 2012

(86) PCT No.: PCT/EP2012/001460
§ 371 (c)(1),
(2), (4) Date: Aug. 29, 2014

(87) PCT Pub. No.: WO2013/127413
PCT Pub. Date: Sep. 6, 2013

(65) Prior Publication Data
US 2015/0032923 A1 Jan. 29, 2015

(30) Foreign Application Priority Data

Mar. 2, 2012 (EP) .................................. 12001441
Mar. 30, 2012 (WO) ................ PCT/EP2012/001441

(51) Int. Cl.
*G06F 13/40* (2006.01)
*G06F 13/14* (2006.01)
*G06F 13/38* (2006.01)
(52) U.S. Cl.
CPC .......... *G06F 13/4022* (2013.01); *G06F 13/14* (2013.01); *G06F 13/4027* (2013.01);
(Continued)

(58) Field of Classification Search
CPC .......... G06F 13/14; G06F 13/20; G06F 13/36; G06F 13/38; G06F 13/40; G06F 13/4004;
(Continued)

(56) References Cited

U.S. PATENT DOCUMENTS 7,523,243 B2 * 4/2009 Bohm .................... G06F 13/385
710/104
2006/0056401 A1 3/2006 Bohm et al.
(Continued)

OTHER PUBLICATIONS

International Preliminary Report on Patentability for PCT/EP2012/001460 dated Sep. 12, 2014 (Form PCT/ISA/373) (English Translation).
(Continued)

*Primary Examiner* — Thomas J Cleary
(74) *Attorney, Agent, or Firm* — Buchanan Ingersoll & Rooney PC (57) ABSTRACT

The invention relates to a method and a coupling device (10) for dynamically allocating USB endpoints (31, 32, 33, 34) of a USB interface (30), which can be accessed using at least two applications, comprising: a USB interface (30) that has at least two ports (P0, P2, P4), each of which comprises at least one USB endpoint (31, 32, 33, 34); and a control device (20) for dynamically allocating the USB endpoints (31, 32, 33, 34). The control device is designed so as to preconfigure each USB endpoint (31, 32, 33, 34) which is required for the at least two applications by means of an initialization process, and thus the control device can switch the allocation of the endpoints according to the access using at least one of the applications without the USB endpoints (31, 32, 33, 34) affected by the switch having to be deactivated.

20 Claims, 8 Drawing Sheets (52) U.S. Cl.
CPC ........ *G06F 13/385* (2013.01); *G06F 13/4068* (2013.01); *G06F 2213/0042* (2013.01)

(58) Field of Classification Search
CPC ............. G06F 13/4022; G06F 13/4027; G06F 13/4068; G06F 13/385
See application file for complete search history.

(56) References Cited

U.S. PATENT DOCUMENTS

| | | |
|---|---|---|
| 2006/0080491 A1 | 4/2006 | Uchizono et al. |
| 2008/0269958 A1* | 10/2008 | Filev .................... B60W 50/10 701/1 |
| 2009/0210608 A1* | 8/2009 | Chang ................. G06F 13/4022 710/316 |
| 2011/0047306 A1* | 2/2011 | Dickens ................. G06F 3/038 710/73 |
| 2014/0253866 A1* | 9/2014 | Carabajal ............... G06F 3/011 351/123 |

OTHER PUBLICATIONS

International Preliminary Report on Patentability for PCT/EP2012/001460 dated Sep. 12, 2014 (Form PCT/ISA/373) (German Translation).
Written Opinion of the International Searching Authority for PCT/EP2012/001460 dated Oct. 4, 2012 (Form PCT/ISA/237).
International Search Report for PCT/EP2012/001460 dated Oct. 4, 2012 (Forms PCT/I5A/220, PCT/ISA/210).

* cited by examiner

COUPLING DEVICE AND METHOD FOR DYNAMICALLY ALLOCATING USB ENDPOINTS OF A USB INTERFACE, AND EXCHANGE TRADING SYSTEM TERMINAL WITH COUPLING DEVICE

CROSS-REFERENCE TO RELATED APPLICATIONS

This application is the United States national phase under 35 U.S.C. §371 of PCT international application no. PCT/2012/001460, filed on Apr. 2, 2012, and claiming priority to European application no. 12001441.0, filed Mar. 2, 2012, and to PCT International application no. PCT/EP2012/001441, filed on Mar. 30, 2012.

BACKGROUND OF THE INVENTION

Field of the Invention

Embodiments relate to a coupling device and a method for dynamically allocating USB endpoints of a USB interface which can be accessed by way of at least two applications, such as an exchange trading system terminal which comprises such a coupling device which can perform the aforementioned method.

Background of the Related Art

In commercially available USB devices, there is always a fixed allocation of input and output devices for each USB endpoint so that several USB devices must be used for each target application. Although depending on the application scenario, and while usually not all devices must be active, all devices must be available to run or operate under all possible scenarios.

Switching individual devices in a USB multifunction device that are connected through the appropriate USB endpoint takes time. Therefore, such switch can usually not be performed without interruption and at least some devices must be temporarily deactivated. In addition, new device cannot be used immediately, but only after a certain period of time.

BRIEF SUMMARY OF THE INVENTION

Embodiments may speed up the time needed for switching individual devices connected to a USB multifunctional device in order to obtain the shortest possible waiting time for the switching operation.

A coupling device according to an embodiment of the invention to dynamically allocate USB endpoints of an USB interface, that can be accessed by at least two different or similar applications, has a USB interface containing at least two ports. The term "application" refers to a computer program or software which is designed to control a corresponding utilization such as a listening or speaking device, which allows the user to control the utilization. At least one USB endpoint is associated with or assigned to each port. Furthermore, the coupling device contains also a control element by means of which the USB endpoints can be dynamically assigned or switched while the device is being operated. Depending on the configuration and operating mode of the device, which the coupling device is assigned to or built-in, a variety of different configuration is offered, which can also be referred to as the operating mode set. The control device is designed such that all USB endpoints required by the executable application operating modes of the set are preconfigured during the initialization. Such initialization is referred to as a USB enumeration or enumeration process. This configuration of all the USB endpoints that may be necessary for the execution of the different operating modes differs from the enumeration process known by Windows®, in which the USB endpoints are only configured for the current or anticipated configuration or the corresponding operating mode. In this until now known method, a new enumeration process had to be executed during the transition from one operating mode to another in order to be able to configure the USB endpoints in an appropriate manner.

DETAILED DESCRIPTION OF THE INVENTION

As previously noted herein, A coupling device according to an embodiment of the invention to dynamically allocate USB endpoints of an USB interface, that can be accessed by at least two different or similar applications, has a USB interface containing at least two ports. The term "application" refers to a computer program or software which is designed to control a corresponding utilization such as a listening or speaking device, which allows the user to control the utilization. At least one USB endpoint is associated with or assigned to each port.

Furthermore, the coupling device contains also a control element by means of which the USB endpoints can be dynamically assigned or switched while the device is being operated. Depending on the configuration and operating mode of the device, which the coupling device is assigned to or built-in, a variety of different configuration is offered, which can also be referred to as the operating mode set. The control device is designed such that all USB endpoints required by the executable application operating modes of the set are preconfigured during the initialization. Such initialization is referred to as a USB enumeration or enumeration process. This configuration of all the USB endpoints that may be necessary for the execution of the different operating modes differs from the enumeration process known by Windows®, in which the USB endpoints are only configured for the current or anticipated configuration or the corresponding operating mode. In this until now known method, a new enumeration process had to be executed during the transition from one operating mode to another in order to be able to configure the USB endpoints in an appropriate manner.

According to embodiments of the invention, it is possible to switch the allocation of an endpoint after they have been accessed by an application that requires or forces a change in the allocation of a USB endpoint by preconfiguring all the USB, without the USB endpoint affected by the switching (or any other USB endpoint) having to be deactivated. By means of this coupling device the dynamic allocation or switching of the USB endpoints is much faster than with the current technology and can normally be completed without interruption. Typically, thanks to the coupling device no static allocation of input or output devices to the USB endpoint has to be maintained, but rather the allocation can be dynamically changed or configured depending on utilization while the control application is running.

According to a preferred embodiment of the coupling device according to the invention at least one of the ports is bidirectional, i.e., that port is associated with two USB endpoints. This provides greater flexibility to the respective applications.

In practice, it would be useful that the control device is configured so that it can perform the switching or dynamic allocation of the USB endpoints, without having to re-run an enumeration process. This simplifies the control during the dynamic allocation or switching of the USB endpoints and speeds up these operations.

According to an advantageous embodiment of the invention, the coupling device comprises an audio device, with at least one, preferably two or more speakers, and preferably a microphone. In this embodiment, the speaker and microphone are selectively turned on and off thanks to the coupling device according to the invention, without these devices having to be enabled or disabled separately.

The operation of the coupling device according to the invention can be improved when a graphical user interface or GUI is included. Such a user interface is also referred to as a message interface, or a USB HID interface. The user interface can be used to adjust the allocation of the respective devices or USB endpoints. This offers the advantage that no proprietary interfaces need to be used, and that standard USB ports or standard USB endpoints can be used.

Further embodiments provide an exchange trading system terminal, in which the advances reported herein can be used. Such terminal includes the above-mentioned coupling device, which has three ports, of which at least one is bi-directional, a microphone associated with the bi-directional port, and two speakers, which are allocated to the other two ports. In this configuration, the two other ports are unidirectional, without the embodiment being limited thereto. An advantage of this embodiment is that it makes the use of the two speakers, and optionally the microphone and in addition, the use of other media sources very flexible and fast—especially when changing or dynamically allocating the USB endpoints. Such device can be advantageously improved with at least two speakers and two microphones. This allows such a terminal to be installed, used, and adapted to the desired configurations in the most flexible manner.

An advantageous embodiment of the terminal according to the invention is that each application that is designed to support the speakers and microphones facilities can be assigned to a separate client.

Embodiments may also provide a method for dynamic allocation of the USB endpoints of an USB interface accessed by at least two applications where the method includes the following steps. First all the USB endpoints for the at least two applications (also for all possible operating modes) are preconfigured during initialization. Thereafter, the USB endpoints are dynamically allocated according to the access of at least one or all of the applications, which is done specifically by switching the allocation. Since all configurations and operating modes are pre-configured, the USB endpoints affected by the change or the dynamic allocation don't need to be deactivated first, but can be used practically without delay after a switching of USB endpoints by the software. It is preferred that this dynamic allocation or switching be performed without executing a new enumeration process.

Further advantages, features and characteristics of the present invention will become apparent from the following description of advantageous embodiments of the invention illustrated in the drawing. However, it is to be noted that this invention is not limited to an audio system, but can also be used in any other system, such as those that process images and/or video data.

Figure 8:
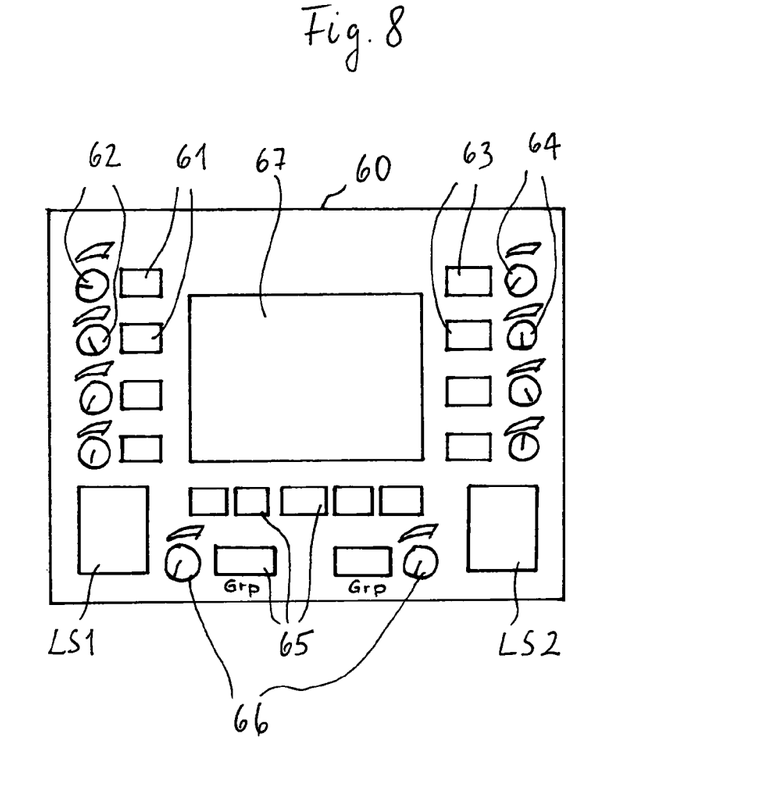
FIG. 8: a graphic representation of such a terminal.

FIG. 8 describes an exchange trading system terminal 60 which is also referred to as a speaker module. Such speaker module serves as a so called stimulus device and/or as a Graphic User Interface by which means e. g. the sound volume and the microphone sensitivity can be adjusted or devices/device groups can be selected. For this purpose a display 67 is provided. Below (left and right) the speaker module 60 is connected to speakers LS1 and LS2. FIG. 8 features an example of the device which lower buttons 65 and potentiometer 66 only work with the speaker module 60 while the keys 61 and potentiometer on the left 62 as well the buttons 63 and potentiometer 64 on the right are connected to applications which are combined in a so called turret 70 (see FIG. 1) which represents a client and works as a logical device. The turret can be an OpenScape® Xpert Client which is an PBX application, for example, and which runs on a standalone PC or a separate "turret hardware" to which the speaker module is connected. It is also possible to integrate the speaker module hardware and the turret hardware into one single device.

Figure 1:
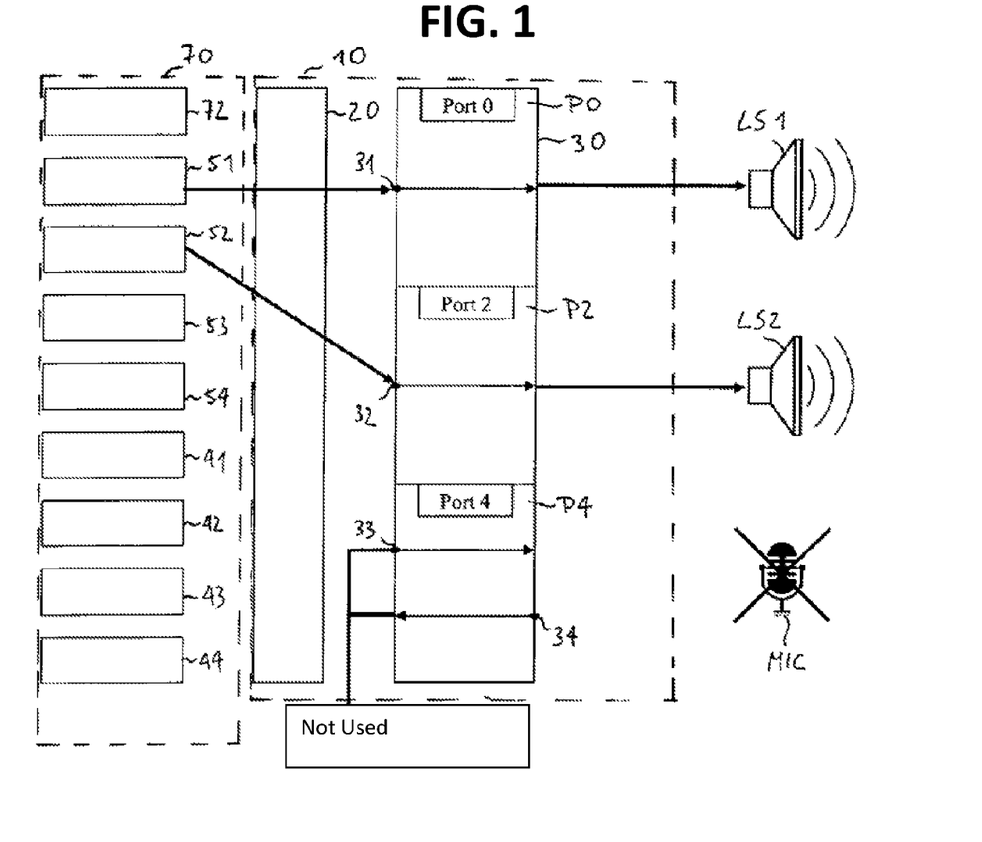
FIGS. 1 to 7: different operating modes of an exchange trading system device according to this invention.

The buttons 61 and the potentiometer 62 can be connected to a sound device 51-54 (see FIG. 1) while the buttons 63 and potentiometer 64 can be connected to a microphone device 41-44 (see FIG. 1). A microphone can be connected to the speaker module 60 which is part of a communication device, however, not shown here.

FIG. 1 schematically shows a coupling device 10 according to the invention, which is associated in this example with a turret 70 shown to the left and, to which speakers LS1 and LS2, and a microphone MIC, as shown to the right, can be connected. The coupling device includes an USB interface 30 with three ports P0, P2, P4. Ports P0 and P2 in this example are unidirectional while port P4 is bidirectional. A USB endpoint 31 or 32 is allocated to the (unidirectional) ports P0 and P2, while two USB endpoints 33 and 34 are allocated to the (bidirectional) port P4. The coupling device 10 further includes a schematically illustrated control device 20 which is able to dynamically allocate or switch the USB endpoints 31-34.

The speakers LS1 and LS2 and the microphone MIC are connected to the coupling device 10 in a conventional manner. The coupling device 10 can be connected by means of a USB connection or by means of two USB connections if a higher current flow is needed. The turret 70 can host four listening devices 51-54 as well as four microphone devices 41-44. These are no hardware devices but applications or drivers for these devices that can access the coupling device 10. Also the turret 70 can include an application 72 (shown at the top) for an external speaker. The speaker module 60 connects to the turret 70 as a multifunction device ("Composite Device") with three separate devices: two speakers and one microphone.

In FIG. 1 an operating mode 1 is described which works as follows: A first listening device 51 accesses the USB endpoint 31 at port P0 and activates the first speaker LS1 while a second listening device 52 activates the USB endpoint 32 at port P2 and delivers signals to the speaker LS2. The speaker module 60 implements two listening devices 51 and 52 (as shown in this example). The USB endpoints 33 and 34 are disabled. It should be noted that for example four different conversations can be transmitted to the speaker LS1 through the listening device 51 which have been previously combined via a so-called media link server. In such media link server, only a maximum of four calls can be combined to create a so-called Stream. Using the other two listening devices 53 and 54, up to two times four different conversations can be listened to with additional devices, not shown here.

Figure 2:
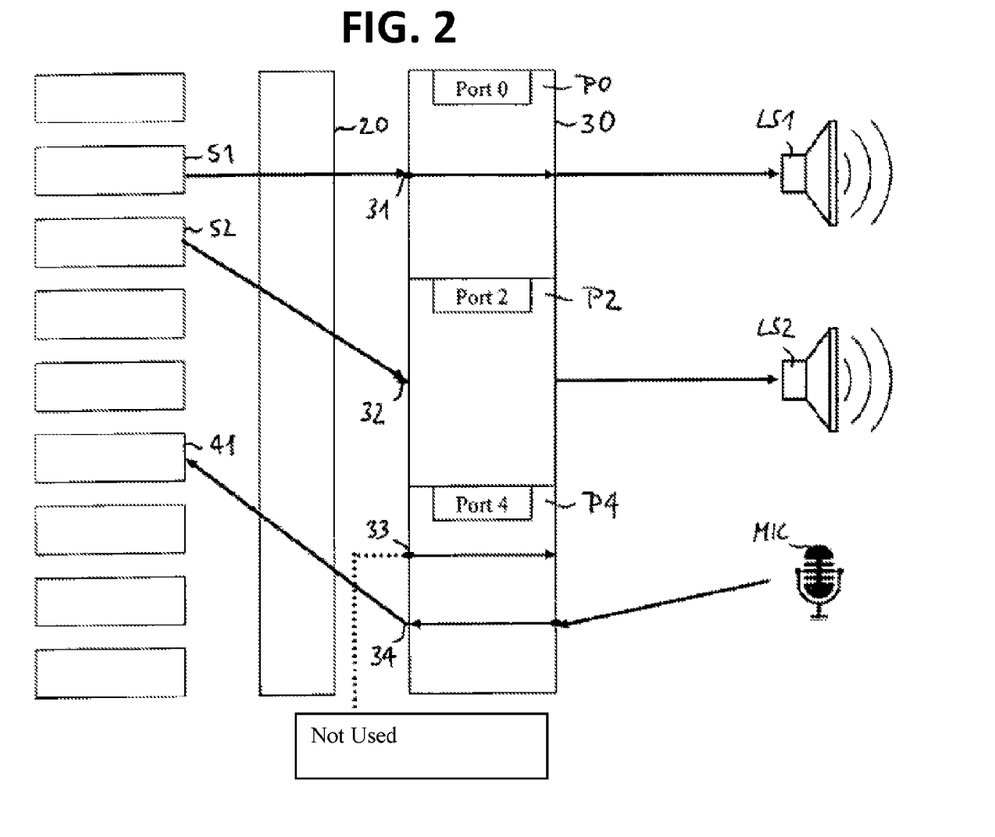

If for example a speaking device 41 accesses the coupling device 10 to enable it to receive input signals from the microphone MIC, the port P4 will be enabled and the signals from the microphone MIC can be transmitted from the USB endpoint 34 at the port P4 to the speaking device 41. The USB endpoint 33 is not used in this case. FIG. 2 illustrates this operating mode 2. It is also possible to visually display on the speaker module 60 that the microphone is active. As shown, two listening devices 51 and 52 are implemented (in addition to speaking device 41).

The above provided explanations of the operation modes 1 and 2 and references are also valid for the operation modes which will be provided below (unless otherwise stated or that it would be technologically impossible).

Figure 3:
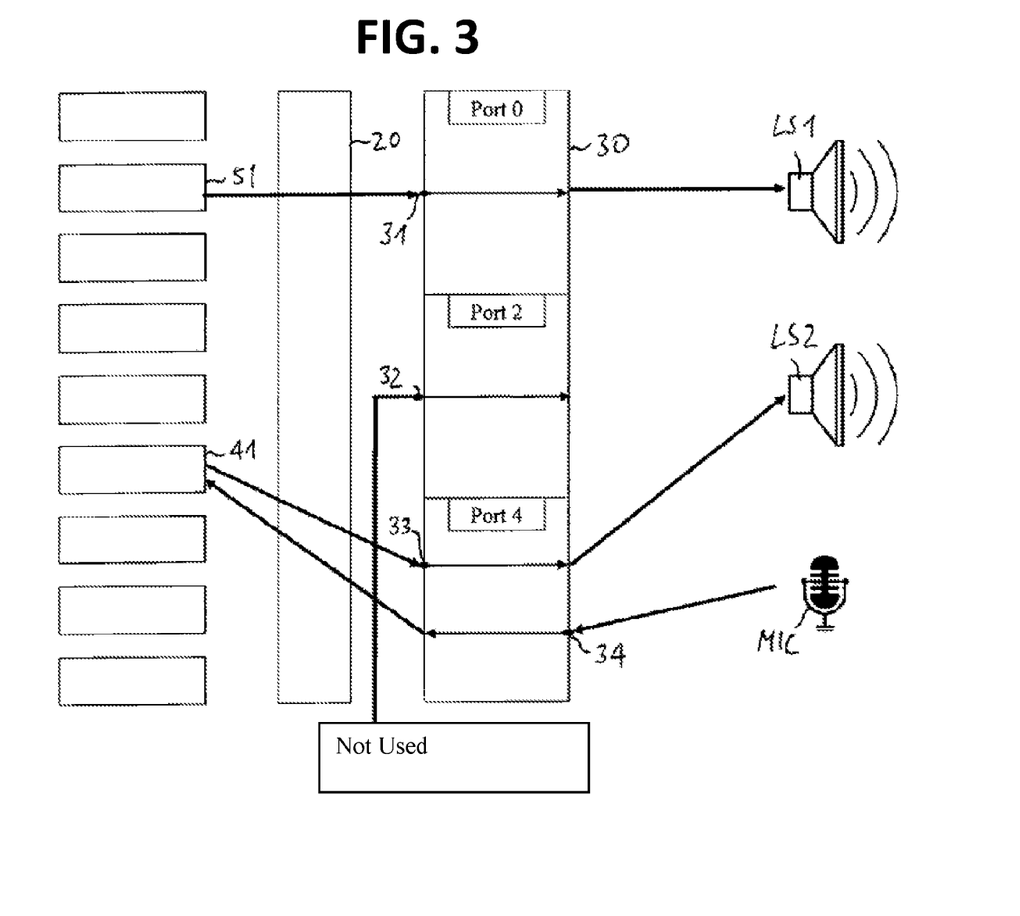

Operating mode 3 is illustrated in FIG. 3. Only a listening device 51 and a speaking device 41 are implemented; the other listening device is being used in combination with a microphone MIC for the handsfree device described below. While the listening device 51 is sending signals to the speaker LS1 as in the two previous operating modes, the speaking device 41 can send signals to the speaker LS2 via the USB endpoint 33 at port P4 and also receive signals from the microphone MIC via the USB endpoint 34 at port P4.

Figure 4:
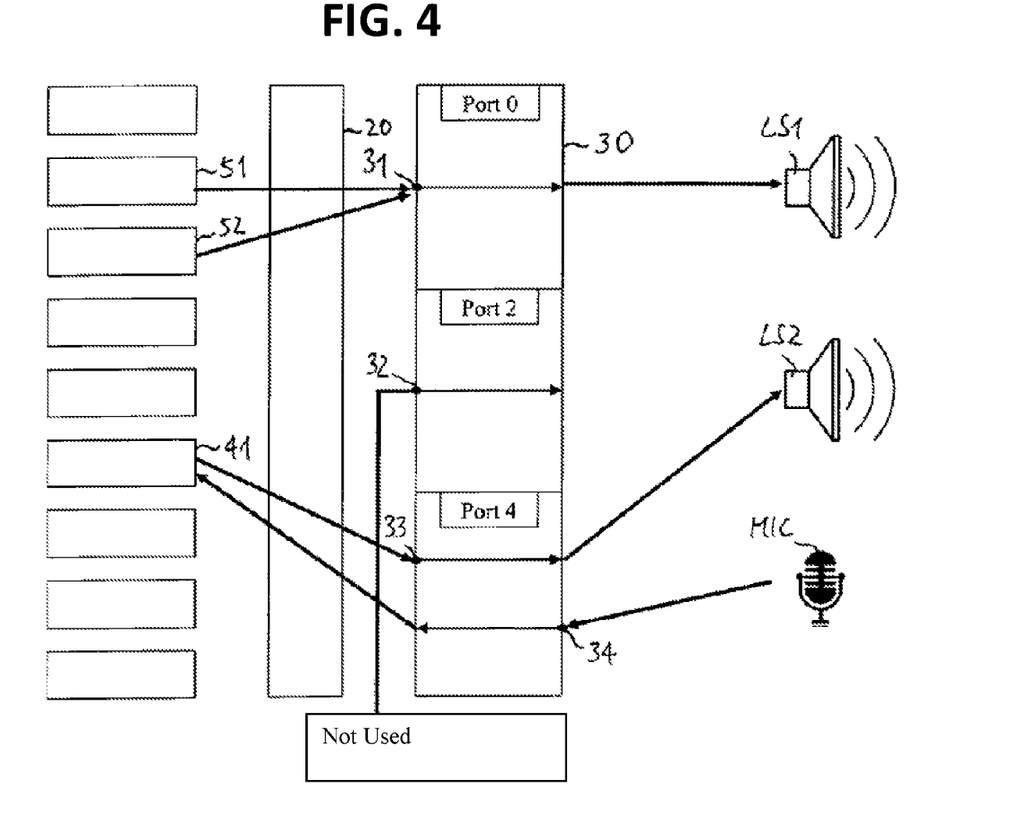

Operating mode 4 is illustrated in FIG. 4. It differs from operating mode 3 in such manner that two listening channels in the turret are mixed into the listening devices 51 and 52 and sent to the speaker LS1 via the USB endpoint 31 at port P0.

Figure 5:
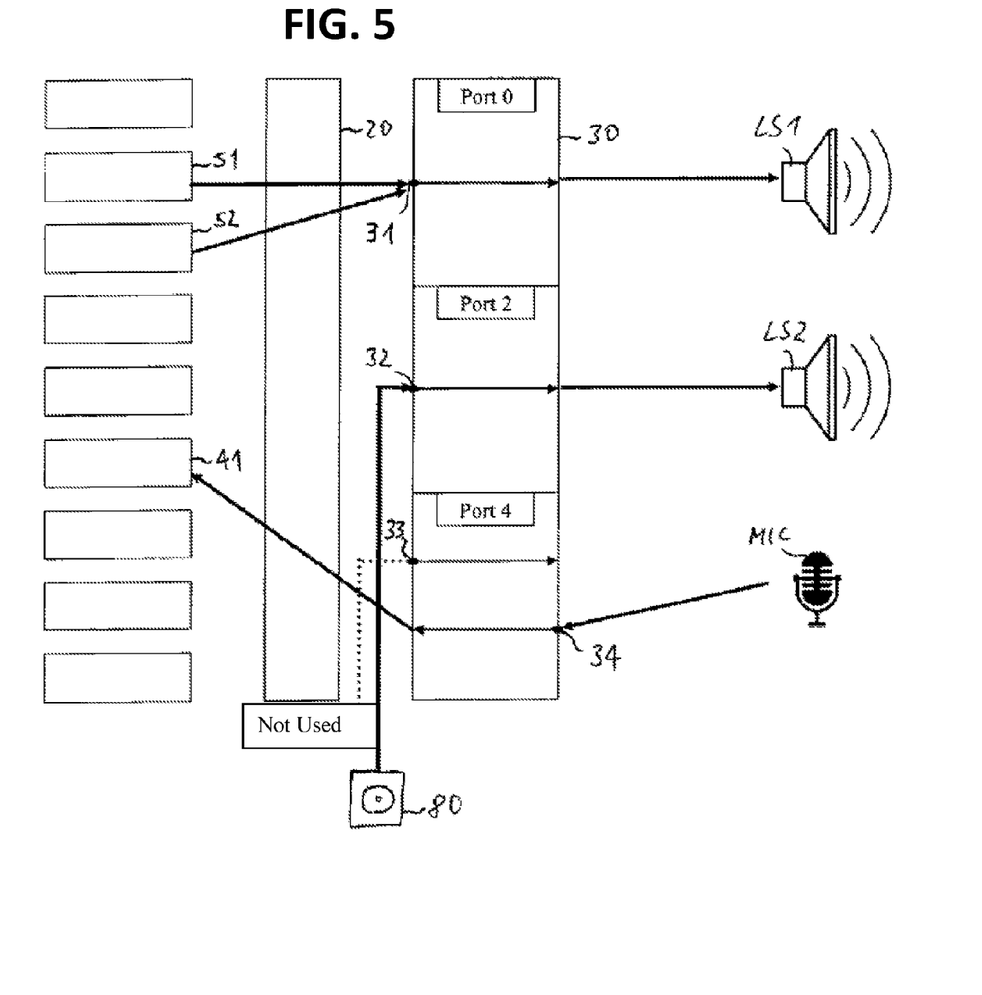

Operating mode 5 is illustrated in FIG. 5. Two listening devices 51 and 52 are implemented which can mix up to 2 (streams)×4 (already mixed conversations)=8 conversations into a single stream and be sent to the speaker LS1 via the USB endpoint 31. A microphone MIC is connected via the USB endpoint 34 to the listening device 41. In this mode 5, the loudspeaker LS2 does not receive—unlike the previously described operating modes—any signal from the listening device or speaking device, but instead from a so-called media player 80 via the USB endpoint 32 at port P2. The possibility to integrate such media player 80, i.e. the transfer of "external" information, increases considerably the flexibility of such a speaker module 60. As described above, the speaker LS2 is not being used for trading purposes but for the media player 80 instead. The microphone is not being used as a normal communication device which would allow listening on a speaker to a response, but instead for example to perform announcements in which no acoustic feedback occurs.

Figure 6:
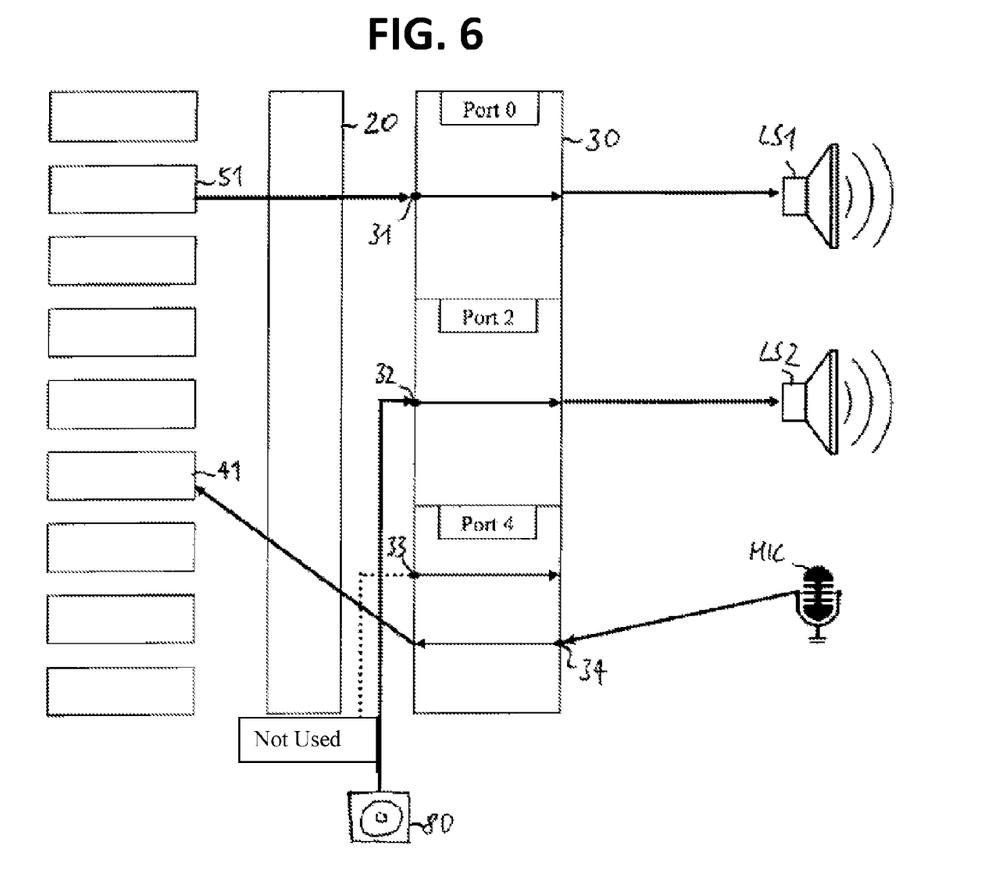

Operating mode 6 is illustrated in FIG. 6. It differs from operating mode 5 in that the speaker LS1 only receives signals from the listening device 51 and no mixed conversations from the listening devices 51 and 52.

Figure 7:
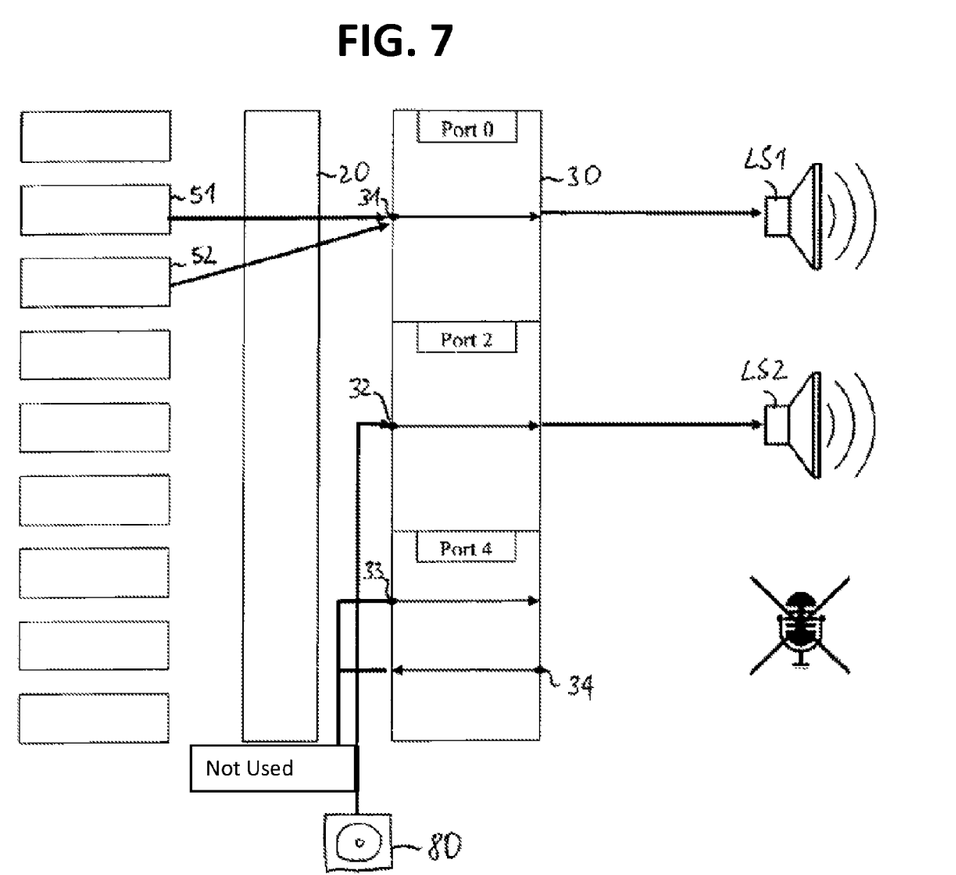

Operating mode 7 is illustrated in FIG. 7. Two listening devices 51 and 52 are implemented without any microphone MIC being connected. As with the two previous modes 5 and 6 the speaker LS2 receives signals from and is being controlled by the media player 80 via the USB endpoint 32 at Port P2. The port P4 with two USB endpoints 33 and 34 is blocked or turned off in this operating mode. The audio signals of the listening devices 51 and 52 are transmitted after being mixed via the USB endpoint 31 at Port P0 to the speaker LS1 for output.

Switching between the operating modes occurs by logical switching or dynamic allocation of the corresponding USB endpoints 31-34, without deactivation of devices or applications and subsequent activation of other devices or applications which would waste time and create delays. The switching can thus be carried out practically without delay. The USB endpoints 31 to, 34 are just logical endpoints, not physical endpoints. Physically there is only one USB interface to which USB ports, also logical units, are allocated.

By way of describing the operating mode 2 we are going to explain which other electronic components are used within the coupling device 10 that have not been explicitly described so far. The listening devices 51 and 52 are transmitting data via the ports P0 and P2 to a so-called IOM-2-interface which is commonly used to connect various signal paths between SOCs (System-On-Chip). Of course other interfaces or ports can be used also. A digital signal processor (DSP) accesses those data and cancels any echoes (i.e. the removal of unwanted feedback), before these data are being properly processed and transmitted to the analog speakers LS1 and LS2. Similarly data which are captured by the analog microphone MIC are sent to the digital signal processor that amplifies and filters them first and then transmits them to the turret 70 via the IOM-2-interface via port P4 where an appropriate application receives and processes them further.

The above mentioned examples describe the coupling device (10) as comprising three ports P0, P2, and P4, and USB endpoints 31-34. This invention however can comprise substantially more ports and USB endpoints. The basic principle of this invention, namely the pre-configuration by means of the initialization of all USB endpoints required for any anticipated configuration or operating mode remains the same in each case. It is therefore easy and user-friendly to switch between operating modes without deactivating devices or applications or without performing an enumeration procedure every time.

It should be noted that the features described in the illustrated embodiments of this invention such as type, design, and arrangement of interfaces, ports, and endpoints as well as the individual components such as microphone, speaker, turret, coupling device, can be features of other embodiments as well (unless specified otherwise or as long as it is technically possible).

FIGURE REFERENCE LIST

10 mounting device
20 control device
30 USB port
31-34 USB endpoint
41-44 speaking device
51-54 listening device
exchange trading terminal/speaker module
61,63,65 button
62,64,66 potentiometer
67 GUI/graphic user interface
70 client—turret
72 application for external speaker
80 media player
LS1, LS2 speaker
MIC microphone
P0-P4 port

The invention claimed is:
1. A terminal comprising:
a coupling device having a universal serial bus (USB) interface and a control element communicatively connected to the USB interface, the USB interface having a plurality of ports, each of the ports comprising at least one USB endpoint, the ports comprising a first port, a second port, and a third port;
a composite device comprising:
a microphone assigned to the first port of the USB interface, the first port being a bidirectional port;
a first speaker assigned to the second port of the USB interface;
a second speaker assigned to the third port of the USB interface;
a turret communicatively connected to the USB interface, the turret comprising:
a first listening device connectable to the first speaker via the second port;
a second listening device connectable to the second speaker via the third port;
a first sound device connectable to the microphone via the first port;
the control element configured to preconfigure and initialize all the USB endpoints of the USB interface such that all the USB endpoints are utilizable by at least two different applications so that all the USB endpoints are dynamically allocatable such that the USB endpoints are switchable by at least one of the applications without deactivation of any of the USB endpoints being dynamically switched.

2. The terminal of claim 1, wherein the first sound device is also connectable to second speaker via at least one of the first port and the third port.

3. The terminal of claim 2, wherein:
the second listening device is also connectable to the first speaker via the second port such that the second listening device is switchable between being connected to the second port and third port such that the second listening device is not connected to the second speaker when the second listening device is connected to the second port and the second listening device is not connected to the first speaker when the second listening device is connected to the third port.

4. The terminal of claim 3, comprising:
a media player connectable to the second speaker via the second port.

5. The terminal of claim 3, wherein the USB endpoints comprise a first endpoint of the first port, a second endpoint of the second port, and a third endpoint of the third port, and wherein the control element is configured to switch between multiple operating modes to dynamically allocate the endpoints of the USB interface, the operating modes comprising a first operating mode and a second operating mode;
the first operating mode being:
the first listening device connected to the first speaker via the second endpoint of the second port;
the second listening device connected to the second speaker via the third endpoint of the third port; and
the first sound device connected to the microphone via the first endpoint of the first port;
the second operating mode being:
the first listening device connected to the first speaker via the second endpoint of the second port;
the first sound device connected to the microphone via the first endpoint of the first port; and
the second listening device connected to the second speaker via the first endpoint of the first port such that the third endpoint of the third port is not in use when the second operating mode is actuated.

6. The terminal device of claim 5, wherein the operating modes comprise a third operating mode, the third operating mode being:
the first listening device connected to the first speaker via the second endpoint of the second port;
the second listening device connected to the first speaker via the second endpoint of the second port such that the third port is not in use when the third operating mode is actuated;
the first sound device connected to the microphone via the first endpoint of the first port; and
the first sound device connected to the second speaker via the first endpoint of the first port.

7. The terminal device of claim 6, wherein the operating modes comprise a fourth operating mode, the fourth operating mode being:
the first listening device connected to the first speaker via the second endpoint of the second port;
the second listening device connected to the first speaker via the second endpoint of the second port;
the first sound device connected to the microphone via the first endpoint of the first port;
the media player connected to the second speaker via the third endpoint of the third port.

8. The terminal device of claim 7, wherein the operating modes comprise a fifth operating mode, the fifth operating mode being:
the first listening device connected to the first speaker via the second endpoint of the second port;
the second listening device connected to the first speaker via the second endpoint of the second port; and
the media player connected to the second speaker via the third endpoint of the third port such that the first endpoint of the first port is not in use for the fifth operating mode.

9. The terminal device of claim 5, wherein the operating modes comprise a third operating mode, the third operating mode being:
the first listening device connected to the first speaker via the second endpoint of the second port;
the second listening device connected to the first speaker via the second endpoint of the second port;
the first sound device connected to the microphone via the first endpoint of the first port;
the media player connected to the second speaker via the third endpoint of the third port.

10. The terminal device of claim 5, wherein the operating modes comprise a third operating mode, the third operating mode being:
the first listening device connected to the first speaker via the second endpoint of the second port;
the second listening device connected to the first speaker via the second endpoint of the second port; and
the media player connected to the second speaker via the third endpoint of the third port such that the first endpoint of the first port is not used for the fifth operating mode.

11. The terminal of claim 5, wherein the control element is configured such that a graphical user interface is generatable on a display to facilitate receipt of input to actuate switching between the operating modes.

12. A method of dynamically allocating universal serial bus (USB) endpoints of a USB interface that is accessible by at least two applications, the method comprising:
preconfiguring all the USB endpoints of the USB interface that are required for the at least two applications, the USB endpoints comprising a first endpoint of a first port, a second endpoint of a second port, and a third endpoint of a third port;

dynamically allocating the USB endpoints when the USB endpoints are accessed by at least one of the applications without disabling the USB endpoints affected by a switch of allocations for at least one of the USB endpoints during switching between different operating modes, the operating modes comprising at least two of:

a first operating mode in which:
- a first listening device is connected to a first speaker via the second endpoint;
- a second listening device connected to a second speaker via the third endpoint; and
- a first sound device connected to a microphone via the first endpoint;

a second operating mode in which:
- the first listening device connected to the first speaker via the second endpoint;
- the first sound device connected to the microphone via the first endpoint; and
- the second listening device connected to the second speaker via the first endpoint such that the third endpoint is not in use when the second operating mode is actuated;

a third operating mode in which:
- the first listening device connected to the first speaker via the second endpoint;
- the second listening device connected to the first speaker via the second endpoint such that the third endpoint is not in use when the third operating mode is actuated;
- the first sound device connected to the microphone via the first endpoint; and
- the first sound device connected to the second speaker via the first endpoint;

a fourth operating mode in which:
- the first listening device connected to the first speaker via the second endpoint;
- the second listening device connected to the first speaker via the second endpoint, the first sound device connected to the microphone via the first endpoint; and
- the media player connected to the second speaker via the third endpoint;

a fifth operating mode in which:
- the first listening device connected to the first speaker via the second endpoint;
- the second listening device connected to the first speaker via the second endpoint; and
- the media player connected to the second speaker via the third endpoint such that the first endpoint is not used for the fifth operating mode.

13. The method of claim 12, wherein the switching is performed such that switching between the first through fifth operating modes occurs.

14. The method of claim 12, wherein the switching is performed such that switching between at least the first through third operating modes occurs.

15. The method of claim 12, wherein the switching is performed such that switching between the first operating mode, the third operating mode, and the fifth operating mode dynamically occurs.

16. The method of claim 12, comprising:
generating a graphical user interface on a display to facilitate receipt of input to actuate the switching between different operating modes.

17. The method of claim 12, wherein the dynamically allocating of the USB endpoints occurs such that a new enumeration process is not utilized for any of the first endpoint, the second endpoint, and the third endpoint.

18. The method of claim 12, comprising:
at least one of:
- switching between the first operational mode and the second operational mode;
- switching between the first operational mode and the third operational mode;
- switching between the first operational mode and the fourth operational mode;
- switching between the first operational mode and the fifth operational mode;
- switching between the second operational mode and the third operational mode;
- switching between the second operational mode and the fourth operational mode;
- switching between the second operational mode and the fifth operational mode;
- switching between the third operational mode and the fourth operational mode;
- switching between the third operational mode and the fifth operational mode; and
- switching between the fourth operational mode and the fifth operational mode.

19. The method of claim 12, wherein the method comprises at least three of:
- switching between the first operational mode and the second operational mode;
- switching between the first operational mode and the third operational mode;
- switching between the first operational mode and the fourth operational mode;
- switching between the first operational mode and the fifth operational mode;
- switching between the second operational mode and the third operational mode;
- switching between the second operational mode and the fourth operational mode;
- switching between the second operational mode and the fifth operational mode;
- switching between the third operational mode and the fourth operational mode;
- switching between the third operational mode and the fifth operational mode; and
- switching between the fourth operational mode and the fifth operational mode.

20. The method of claim 12, wherein the method comprises:
- switching between the first operational mode and the second operational mode;
- switching between the first operational mode and the third operational mode;
- switching between the first operational mode and the fourth operational mode;
- switching between the first operational mode and the fifth operational mode;
- switching between the second operational mode and the third operational mode;
- switching between the second operational mode and the fourth operational mode;
- switching between the second operational mode and the fifth operational mode;
- switching between the third operational mode and the fourth operational mode;

switching between the third operational mode and the fifth operational mode; and switching between the fourth operational mode and the fifth operational mode.

\* \* \* \* \*